Nov. 27, 1945.  E. ERICKSON  2,389,845
DISTRIBUTOR
Filed Feb. 18, 1943

Ewald Erickson
INVENTOR.

BY Cleveland B. Shallenbaugh
ATTORNEY

Patented Nov. 27, 1945

2,389,845

UNITED STATES PATENT OFFICE 2,389,845

DISTRIBUTOR

Ewald Erickson, Watertown, Minn., assignor to Hercules Powder Company, Wilmington, Del., a corporation of Delaware Application February 18, 1943, Serial No. 476,293

8 Claims. (Cl. 222—310)

This invention relates to an improvement in distributing hoppers for driers and more particularly to distributing hoppers used in conjunction with continuous driers for material of the wet-solids type, such as, curd in the manufacture of casein.

In the drying of material of the wet-solids type, the temperature and time of drying depend on: The physical condition, moisture content and fineness of grinding of the material; the type of drier; the volume and temperature of the air circulated through the drier; and the uniformity and thickness of the layer of material spread on the conveyor belt of the drier.

It is uniformity and thickness of the layer of material as spread on the conveyor belt of the drier to which the present invention is directed, as it has been found that unless these factors are precisely controlled an inferior product will result. This fact is emphasized in the manufacture of casein, for if the curd is not spread uniformly the time of drying is increased to that required by the thickest portions and, furthermore, too thick a layer of curd not only retards drying but also tends to affect color and quality adversely. Conversely, too thin a layer forms blow-holes and cracks and the drier ceases to adequately function.

The primary object of this invention is to provide means whereby material to be dried is continuously and uniformly spread in predetermined thickness on a moving conveyor belt.

Another object of this invention is to provide means for adjusting the thickness of material spread on a moving conveyor belt.

Other objects of the invention will appear hereinafter the novel features and combinations being set forth in the appended claims.

Generally described, the present invention comprises a hopper, an adjustable screed secured to the trailing side of said hopper and extending toward the leading side thereof to form a bottom for a portion of the hopper, said adjustable screed adapted to maintain material as discharged from the bottom of the hopper in a uniform depth on a surface disposed beneath said hopper and in movement thereto, means for maintaining an equal distribution of material as charged to the hopper, and means for maintaining an equal distribution of material as discharged from the hopper.

Figure 1:
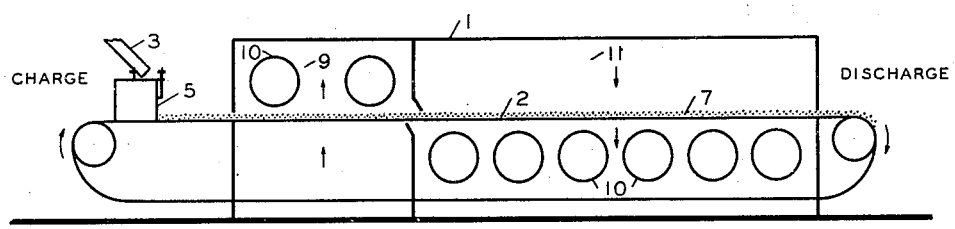
Figure 2:
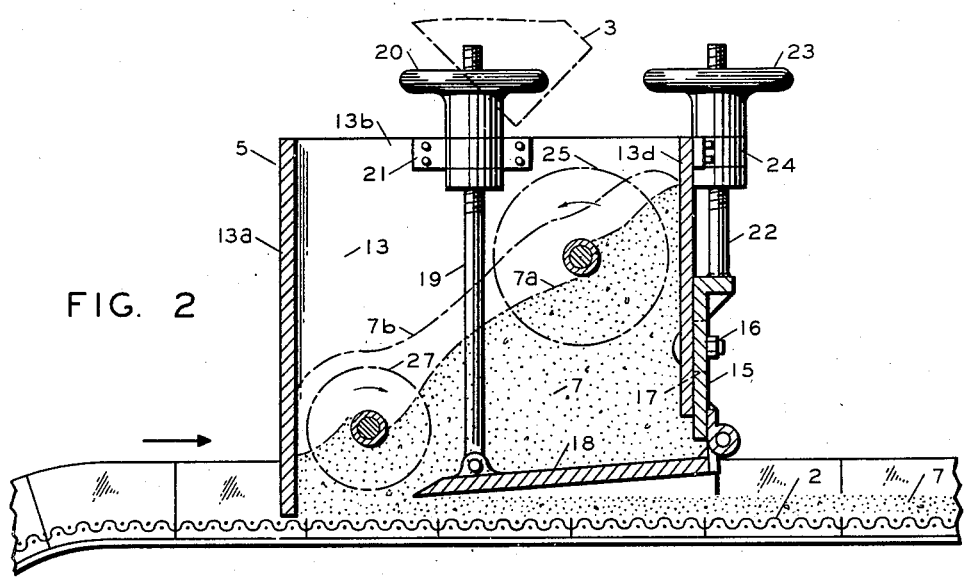
Figure 3:
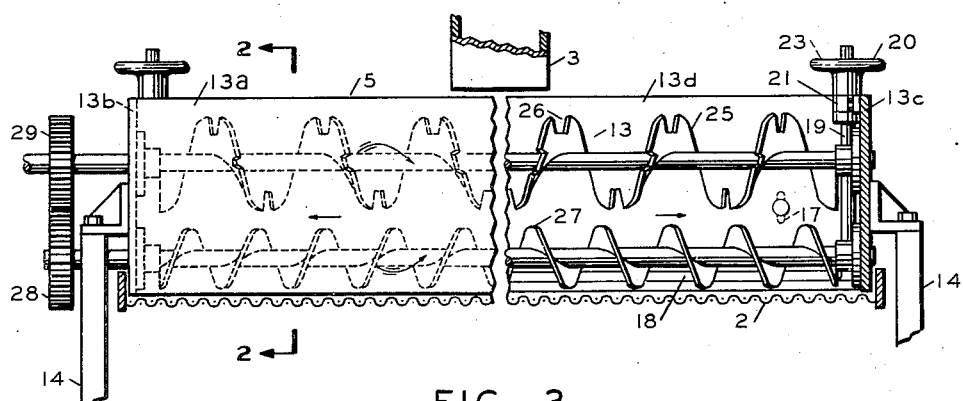

A preferred embodiment of the invention has been chosen for purposes of illustration and description and is shown in the accompanying drawing forming a part of the specification wherein reference symbols refer to like parts wherever they occur. Figure 1 is a diagrammatical, vertical, sectional view, taken lengthwise of the run of the conveyor, of one form of apparatus for the embodiment of the invention. Figure 2 is an enlarged transverse sectional view of the distributing hopper, and Figure 3 is a part-elevational, part-sectional view of the front of the hopper shown in Figures 1 and 2.

In Figure 1, a drier 1 of conventional design has an endless conveyor belt 2 of open mesh top extending therethrough. The conveyor belt 2 is preferably of the sectional type with continuous side guards and with sections of the mesh fastened to and carried by roller chains at the sides. This type conveyor permits but very little sag in the individual sections of the conveyor belt. A material to be dried is carried by a spout 3 and charged into a distributing hopper 5 which is superposed transversely to the conveyor belt 2. The material represented by 7 as discharged from the hopper 5 is distributed in a layer of uniform depth upon the conveyor belt 2. The belt progresses the material into drying chamber 9 of the drier 1.

The drying chamber 9 is of conventional design having motor driven fans 10 for blowing drying medium, such as air, at high velocity over steam heaters (not shown) which are located directly below the conveyor belt 2. The air is heated as it passes over the steam heaters and then passes through the material 7 as disposed on the conveyor belt 2 in a layer of uniform depth. The placing of the material 7 in a layer of uniform depth on the conveyor belt 2 as performed by the hopper 5 enables the heated air to uniformly pass through the material and, accordingly, insures a uniform drying of the material.

From the drying chamber 9, the material 7 passes into drying chamber 11 which has motor-driven fans 10 and steam heaters (not shown) disposed below and above, respectively, of the conveyor belt 2. Circulation is similar to that discussed above for chamber 9, with the exception that the direction of flow of the air is opposite, as indicated by the arrows.

Referring now more specifically to Figure 2 and Figure 3, the distributing hopper 5 has a trough 13 rigidly secured to a pair of supports 14 which in turn are secured to the drier 1 or other suitable supporting means. The lower edge of the leading side 13a and the ends 13b and 13c of the trough are in close proximity to the surface of conveyor belt 2 so that material charged into the hopper will not appreciably leak therefrom. The trailing side 13d of the trough has a side member 15 adjustably secured to the trailing side by a plurality of bolts 16. The member 15 is provided with elongated slots 17 so that said member can be adjusted relative to the desired thickness of the layer of material disposed on the conveyor belt and then secured by the bolts. A screed 18, extending the length of the trough 13, has its trailing edge hingedly secured to the member 15 and its leading edge supported at each end by a threaded rod 19. These rods have their lower ends hingedly secured to the screed 18 and their upper ends in threaded engagement with hand-wheels 20 which are rotatably secured by bearing members 21 to the trough 13. A threaded rod 22 is rigidly secured to each end of the member 15 and these rods are in threaded engagement with hand-wheels 23 which are rotatably secured by bearing 24 to the trough 13. The hand-wheels 20 and 23 provide delicate adjustment of the screed 18 and in conjunction with the adjustable member 15 provide considerable range for obtaining the proper angle between the screed and the material being distributed, thereby providing means for obtaining a smooth surface which is essential to maintenance of uniform depth. The leading edge of the screed 18 is terminated in a knife-like edge and it has been found in distributing wet-solids material that this type edge will maintain a reasonably smooth surface on the material.

To maintain equal distribution of the material 7 as charged to the trough 13, through the spout 3, a right and left hand cut flight screw conveyor 25 is provided in the upper portion of the trough. The cuts 26 in screw conveyor 25 are progressively reduced in area from the position of the spout 3. The progressively reduced cuts 26 in the flights of conveyor 25 "throttle" the flow of material throughout the length of the trough. It is appreciated that variable pitch screws can be utilized for the same purpose, however, it has been found that by providing cuts to achieve this purpose, that adjustments can be made more readily by increasing or decreasing the area of the cuts as the flow characteristics of a particular material necessitate. To maintain equal distribution of the material as conveyed or discharged from the trough a right hand and left hand screw conveyor 27 is provided in the lower portion of the trough 13 and in juxtaposition to the screed 18. The material 7 is uniformly distributed by the conveyor 25 in conjunction with the conveyor 27 throughout the length of the trough 13, thereby maintaining a supply of material in contact with the leading edge of the screed 18 at all times. A gear 28 is rigidly secured to the shaft of screw conveyor 27 which gear engages a gear 29 rigidly secured to the shaft of screw conveyor 25. These gears are driven in synchronous relationship to the rate of travel of the conveyor belt and rate of charge of material by suitable means (not shown).

An example of the operation of the invention is given for the spreading of wet casein curd on the conveyor belt of a drier. The casein is delivered by spout 3 into the hopper 5. The hopper has a 6-inch cut flight horizontal screw conveyor 25 for distribution of the casein from the center feed spout 3 to the outside edges of the drying screen of the conveyor which lie beneath the bottom of the hopper. This distribution is accomplished by using both right and left hand flights which meet at a joint starting point on the shaft of the conveyor directly beneath the supply spout. The cut-out sections 26 of the conveyor flights vary from larger openings near the center to smaller openings further out on the shaft toward the edge of the drying screen. These cut-out sections move only enough of the curd to the extreme edge of the drying screen to maintain the proper supply of material for spreading at that point. The larger cut-out sections near the source of supply allow more of the curd to drop out of the screw conveyor and thus the proper distribution across the drying screen within the hopper is accomplished. Near the bottom of the feed hopper 5 and in close proximity to the conveyor screen is a 4-inch, right and left hand standard screw conveyor 27 which operates in the same manner as the cut flight screw conveyor 25 referred to above and which assists the cut flight conveyor in obtaining a more constant and even distribution of the curd across the entire bottom of the supply hopper. These screw conveyors are rotated by gears 28 and 29 which are driven by suitable means (not shown). The speeds of these screw conveyors usually run from 8 to 12 R. P. M., therefore, a variable speed arrangement for the driving means to obtain satisfactory results with different types of curd is desirable. The overall possible range of speed may be extended somewhat beyond the two limits given, but the limits as given have been found to be preferable for the handling of curd. The action of the screw conveyors on the curd charged to the hopper is shown specifically in Figure 2, wherein 7a represents the average level of material in the trough and 7b represents the approximate maximum height of material at the carrying side of the flights, when average loading is maintained. The hopper 5 has no bottom except for an adjustable shelf or screed 18 covering a portion of the bottom area on the side toward the drier. The hopper edges, therefore, must extend to within about ½-inch or less of the top of the conveyor screen, and the movement of the conveyor screen under the bottom of the hopper causes the curd to be carried on the screen from the hopper. With this arrangement, the conveyor screen is self-loading and the partial bottom or screed of the hopper permits varying the depth of curd the conveyor screen is permitted to carry out from under the hopper. In this manner, a layer of casein curd of uniform depth is disposed on the surface of the conveyor screen.

It is evident that there are numerous factors which will influence conditions for the most satisfactory operation of the invention, the actual limits of which cannot be established except by a detailed study of the materials to be distributed and the intermediate and finished products involved. In this respect, it will be seen in distributing some materials, such as surfacing material over a non-traveling surface, that a traveling motion imparted to the hopper will achieve the results contemplated by the invention.

While the present invention has been drawn primarily to the distribution of wet casein curd, materials of many kinds, such as sulphur sludge, phosphate fertilizer, calcium carbonate, magnesium carbonate, lime putty and surfacing materials, are efficiently distributed in accordance with the invention.

The advantages of the present invention reside in the application of a layer of material of uniform depth throughout, and in conjunction with drying apparatus, the speed of drying, the uniformity of drying, and the prevention of "blows" by distribution of the material in absolute uniformity to achieve a uniform resistance to the drying medium circulated therethrough.

What I claim and desire to protect by Letters Patent is:

1. A material distributor comprising a hopper superposed transversely to a continuous foraminous conveyor belt, a supporting member adjustably secured to the trailing side of said hopper, an adjustable screed member hingedly secured to said supporting member and extending toward the leading side of the hopper to form a bottom for a major portion of the hopper, said adjustable screed member adapted to screed material as carried by the conveyor belt from the hopper, a rod member having its lower end hingedly secured to the adjustable screed member near the leading edge thereof and extending upwardly therefrom, said rod member adapted to provide support to the leading edge of the screed member, means for adjustably securing the upper end of the rod member to adjust the leading edge of the screed member relative to the conveyor belt, separate means for adjusting relative to the conveyor belt the supporting member and the edge of the screed member which is secured to the supporting member, means for maintaining an equal distribution of material as charged to the hopper, and means for maintaining an equal distribution of material as discharged from the hopper.

2. A material distributor comprising a hopper superposed transversely to a continuous foraminous conveyor belt, an adjustable member hingedly secured to the trailing side of said hopper and extending toward the leading side thereof to form a bottom for a major portion of the hopper, said adjustable member adapted to screed material as carried by the conveyor belt from the hopper, a right and left hand screw conveyor for maintaining an equal distribution of material as centrally charged to the hopper, and a right hand and left hand screw conveyor for maintaining an equal distribution of material as discharged from the hopper.

3. A material distributor comprising a hopper superposed transversely to a continuous foraminous conveyor belt, a supporting member adjustably affixed to the trailing side of the hopper, an adjustable member hingedly secured to said supporting member, said adjustable member extending toward the leading side of said hopper to form a bottom for a major portion of the hopper and adapted to screed material as carried by the conveyor belt from the hopper, means in association with the adjustable member and the supporting member, respectively, for externally adjusting the hopper bottom relative to the conveyor belt, a right and left hand screw conveyor for maintaining an equal distribution of material as centrally charged to the hopper, and a right hand and left hand screw conveyor for maintaining an equal distribution of material as discharged from the hopper.

4. A material distributor comprising a hopper superposed transversely to a continuous foraminous conveyor belt, a supporting member adjustably affixed to the trailing side of the hopper, an adjustable member hingedly secured to said supporting member, said adjustable member extending toward the leading side of said hopper to form a bottom for a major portion of the hopper and adapted to screed material as carried by the conveyor belt from the hopper, means in association with the adjustable member and the supporting member, respectively, for externally adjusting the hopper bottom relative to the conveyor belt, a right and left hand cut flight screw conveyor for maintaining an equal distribution of material as centrally charged to the hopper, and a right hand and left hand screw conveyor for maintaining an equal distribution of material as discharged from the hopper.

5. The material distributor according to claim 4 wherein said right and left hand cut flight screw conveyor has the cuts in the flights thereof progressively reduced in area from the point of material charge.

6. The material distributor according to claim 4 wherein said adjustable member has the leading side thereof terminating in a knife-like edge.

7. A distributor of the class described having in combination a hopper, an adjustable screed secured to the trailing side of said hopper and extending toward the leading side thereof to form a bottom for a major portion of the hopper, said adjustable screed adapted to maintain material as discharged from the bottom of the hopper in a uniform depth on a surface disposed beneath said hopper and in movement thereto, a rod member having its lower end hingedly secured to the adjustable screed near the leading edge thereof and extending upwardly therefrom, said rod member adapted to provide support to the leading edge of the screed, means for adjustably securing the upper end of the rod member to adjust the leading edge of the screed member relative to the said surface, separate means for adjusting relative to the conveyor belt the edge of the screed member which is secured to the trailing side of the hopper, means for maintaining an equal distribution of material as charged to the hopper, and means for maintaining an equal distribution of material as discharged from the hopper.

8. A distributor of the class described having in combination a hopper, an adjustable screed secured to the trailing side of said hopper and extending toward the leading side thereof to form a bottom for a major portion of the hopper, said adjustable screed adapted to maintain material as discharged from the bottom of the hopper in a uniform depth on a surface disposed beneath said hopper and in movement thereto, a right and left hand screw conveyor for maintaining an equal distribution of material as centrally charged to the hopper, said screw conveyor having cut flights, the cuts of which are progressively reduced in area from the position of material charge, and a right hand and left hand screw conveyor for maintaining an equal distribution of material as discharged from the hopper.

EWALD ERICKSON.